US012083486B2

(12) United States Patent
Olivier et al.

(10) Patent No.: US 12,083,486 B2
(45) Date of Patent: Sep. 10, 2024

(54) MIXING DEVICE

(71) Applicant: MERCK PATENT GMBH, Darmstadt (DE)

(72) Inventors: Stephane Olivier, Rosheim (FR); Gaetan Bour, Ostwald (FR)

(73) Assignee: Merck Patent GmbH, Darmstadt (DE)

( * ) Notice: Subject to any disclaimer, the term of this patent is extended or adjusted under 35 U.S.C. 154(b) by 579 days.

(21) Appl. No.: 17/259,444

(22) PCT Filed: Jul. 10, 2019

(86) PCT No.: PCT/EP2019/068473
§ 371 (c)(1),
(2) Date: Jan. 11, 2021

(87) PCT Pub. No.: WO2020/011818
PCT Pub. Date: Jan. 16, 2020

(65) Prior Publication Data

US 2021/0229051 A1 Jul. 29, 2021

(30) Foreign Application Priority Data

Jul. 12, 2018 (EP) .................................... 18290081

(51) Int. Cl.
*B01F 31/55* (2022.01)
*B01F 35/21* (2022.01)
(Continued)

(52) U.S. Cl.
CPC .......... *B01F 31/55* (2022.01); *B01F 35/2134* (2022.01); *B01F 35/22161* (2022.01); *B01F 35/3204* (2022.01)

(58) Field of Classification Search
CPC ....................................................... B01F 31/55
(Continued)

(56) References Cited

U.S. PATENT DOCUMENTS

| | | | | |
|---|---|---|---|---|
| 44,573 A * | 10/1864 | Willard | B23D 67/00 173/100 |
| 55,009 A * | 5/1866 | Hyde | B25D 11/10 173/186 |

(Continued)

FOREIGN PATENT DOCUMENTS

| | | |
|---|---|---|
| CN | 106492694 A | 3/2017 |
| FR | 3013036 B1 | 12/2016 |

(Continued)

OTHER PUBLICATIONS

Office Action in corresponding ID application P00202100879 dated Sep. 29, 2022 (pp. 1-2).

(Continued)

*Primary Examiner* — David L Sorkin
(74) *Attorney, Agent, or Firm* — Millen, White, Zelano & Branigan P.C.; Wan-Ching Montfort

(57) ABSTRACT

A mixing device (1) for cyclically imparting a force on an external surface (A) of a bag (B) for agitating a content (C) of the bag (B), the mixing device (1) comprising a lever (2) supported so as to be able to pivot about a pivot (3), a weight (4) provided on a first side of the lever (2), a driver (5) arranged to cooperate with the lever (2), a motor (6) for moving the driver (5) to lift the first side of the lever (2) with the weight (4) against gravity and to drop the first side against the external surface (A) of the bag (B), and a holder (7) for supporting the mixing device (1) such that the first side of the lever (2) can contact the external surface (A) of the bag (B) in the drop motion.

19 Claims, 3 Drawing Sheets

(51) Int. Cl.
*B01F 35/221* (2022.01)
*B01F 35/32* (2022.01)

(58) Field of Classification Search
USPC .................................. 173/100; 366/215, 275
See application file for complete search history.

(56) References Cited

U.S. PATENT DOCUMENTS

| | | | | |
|---|---|---|---|---|
| 310,812 | A * | 1/1885 | Folsom | B21J 9/18 173/132 |
| 1,960,640 | A * | 5/1934 | Lajeunesse | A47J 43/042 366/215 |
| 2,406,403 | A * | 8/1946 | Rogers | B01F 31/55 366/97 |
| 4,784,297 | A * | 11/1988 | Katz | B67D 3/00 222/161 |
| 4,907,723 | A * | 3/1990 | Katz | B67D 3/0012 222/196 |
| 6,190,913 | B1 | 2/2001 | Singh | |
| 2003/0031088 | A1* | 2/2003 | Baron | B01F 35/513 366/197 |
| 2003/0192676 | A1* | 10/2003 | Briesmeister | A23L 3/022 165/96 |
| 2005/0063250 | A1 | 3/2005 | Hubbard | |
| 2011/0080800 | A1 | 4/2011 | White | |

FOREIGN PATENT DOCUMENTS

| | | | |
|---|---|---|---|
| JP | 2004097862 | A | 4/2004 |
| SU | 1681937 | A1 | 10/1991 |
| WO | 12000502 | A1 | 1/2012 |

OTHER PUBLICATIONS

International Search Report PCT/EP2019/068473 dated Oct. 18, 2019 (pp. 1-4).
Office Action in corresponding Brazil application BR112021000423-8 dated Feb. 8, 2023 (pp. 1-4) and informal translation thereof (1 page).
Office Action in corresponding Philippine Application Type/No. 1/2020/552093 dated May 29, 2024 (pp. 1-3).

* cited by examiner

MIXING DEVICE

This invention concerns a mixing device for promoting media dissolution in a bag.

This invention is applicable in particular in the fields of food and beverage, biopharmaceutical, cosmetics, hospital, but also for diagnostic, healthcare and research for instant media preparation, for example pathogen testing, bioburden and sterility testing.

The mixing device of this invention is a simple device for creating a continuous liquid motion in the interior volume of a closed bag to reduce dissolution time of substances in a liquid, to homogenize a solution or to keep particles in suspension.

In the above fields liquid media are often prepared and stored in bottles, vials or bags. The media can be in the form of a concentrated liquid solution or a powder or a granulated material which is dissolved and/or mixed with a liquid, normally water or a solvent, or other substances.

A particularly interesting trend in the above fields is, to support convenient, safe and low-cost solutions, preparation of the culture media by using a bag containing granulated powder media that can be dissolved in a volume of water in order to create a highly concentrated media stock solution. The higher concentration has advantages of a compact packaging, it reduces cost of shipment and avoids the risk of growth in the concentrate.

The powder dissolution in the bag often requires a massaging step that needs to be performed repetitively during several minutes during a total dissolution time. The dissolution time of course can very base on the media formulation, the granulometry (powder or granules), the water temperature and other factors. The massaging by hand is a tedious and uncontrolled operation that can moreover impact the quality of the dissolution and time before initial use of the dissolved media. Moreover, the cost of labour in this field is high so that it is ineffective to occupy working time of qualified personnel with this kind of task.

There exist a number of automatic solutions including devices for agitating an entire bag for the purpose of generating a wave in the bag.

US 2005-063250 A discloses a device with one or more bags that are capable of being selectively pressurized and deflated in conjunction with a disposable bio bag such as a fermenter, mixing bag, storage bag and the like. The pressure bag(s) may surround a selected outer portion of the bio bag or may be contained within an inner portion of such a bio bag. By selectively pressurizing and deflating the pressure bag(s) one is able to achieve fluid motion in the bio bag, thereby ensuring cell suspension, mixing and gas transfer within the bag without damaging shear forces or foam generation.

Another type of process involves mechanical rocking devices including a support on which a bio bag is placed, wherein a rocking mechanism moves the support with the bag to and fro, thereby inducing a wave-like motion to the liquid contained in the bag. Examples of such devices are disclosed in WO 2012/000502 A1 or U.S. Pat. No. 6,190,913 B.

These prior devices are relatively large because the support is normally either designed to receive different sizes of bags so that it is designed to accommodate the bag with the maximum possible size or the device can be too small to process a particular bag. The devices accordingly consume considerable footprint in the laboratory, in particular if not in use.

The invention aims at providing a mixing device for agitating the content of a bag which is convenient to use, which is safe to use and which can be provided at low cost and requires a minimum storage space.

The present invention provides a mixing bag with the features of claim 1. Preferred embodiments are defined in the dependent claims.

The mixing device of the invention for cyclically imparting a force on an external surface of a bag for agitating a content of the bag comprises a lever supported so as to be able to pivot about a pivot, a weight provided on a first side of the lever, a driver arranged to cooperate with the lever, a motor for moving the driver to lift the first side of the lever with the weight against gravity and to drop the first side against the external surface of the bag, and a holder for supporting the mixing device such that the first side of the lever can contact the external surface of the bag in the drop motion. The mixing device of the invention is a simple motorized accessory which can be automatically operated and can be used to lift a weight that is subsequently freely released to vigorously impact and deform the bag layer, thereby agitating its content by creating inside the bag a liquid flux that puts undissolved powder in suspension and notably helps dissolution by increasing the contact of dry material with water and reducing the local concentration gradient round particles.

The imparting of the force on the exterior surface of the bag can be repeated until full dissolution is achieved, preferably if a controller is included for controlling the operation of the motor of the drive mechanism. The mixing device of the invention can be easily moved around relative to the bag and placed at the optimal dissolution point of the bag, for example at one of several powder settling points or where the bag layer deformation induces the maximal flux in the bag. After use it can be easily stored requiring only a minimum space.

Several mixing devices can be placed at different positions on the same bag and, if useful, operated with different mixing cycles that can be set in phase or in opposite phase. To improve operation the bag with which the mixing device is used has preferably no or only a minimum volume of air inside. Alternatively, the size of the overall bag volume should be relatively large compared to the volume of the liquid inside the bag, i.e. the bag should be preferably underfilled.

The mixing device of the invention can be used with any process where the bag is laid on a surface, i.e. a table or a workbench, and replaces manual massaging by an automated mechanised massaging. This can ultimately avoid muscular traumatic diseases of the personal and can provide a consistent and repeatable and controllable massaging strength and duration as compared to manual human operation.

The mixing device can be brought to the place where the bag is stored and not vice versa because the mixing device is a transportable device.

The mixing device of the invention acts on the external surface or layer of the bag and therefore can be used in situations where, for example, magnetic stirrers cannot be used inside the bags. As compared to manual operation the overall dissolution time can be reduced and the mixing device is effectively compatible with any bag size that is normally encountered in the above fields of use.

Due to its portability and small footprint the mixing device of the invention can be easily used inside an incubator for mixing during processing and it can minimize bag friction during automatic massaging.

The mixing device can avoid inadvertent bag punching or damaging because the setup of the weight of the lever can be designed according to the typical bags and the impact force is constant once determined. Preferably, the driver is engaged with or is arranged to be engaged with and disengaged from the lever at a position spaced from the pivot, preferably a second side of the lever opposite to the pivot from the first side, or a pivot axis of the lever, and the motor is arranged to move the driver in engagement with or to cyclically move the driver into and out of engagement with the lever, or the pivot axis of the lever to lift the first side with the weight against gravity and to drop the first side due to gravity of the weight against the external surface of the bag. The force for lifting the first side of the lever with the weight can be applied on any point of the lever spaced apart from the pivot, which has the advantage of utilizing the leverage effect the larger the distance is of the point where the lifting force is introduced to the lever. The force or momentum for lifting the lever can also be introduced directly at the pivot axis.

Preferably, the driver comprises a cam arranged to be rotated by the motor. Preferably, the driver comprises one or more pin(s) or tooth/teeth arranged eccentrically from an axis of the motor and connected with the axis of the motor so as to be able to perform an orbiting movement.

Preferably, the driver is arranged such that the disengagement of the driver from the lever or the pivot axis is made abrupt when the weight at the first side of the lever is at the top lift position.

Preferably, the mixing device further comprises an abutment for limiting the drop movement of the lever at a bottom drop position.

Preferably, the holder comprises a stand arranged to be placed below the bag and a bracket connected to the stand and supporting the lever above the bag with the bag placed therebetween.

Preferably, a horizontal extension of the stand and/or the bracket is adjustable in order to accommodate the device for bags of different size.

Preferably, the vertical spacing of the weight in a/the bottom drop position of the lever above the stand of the holder is adjustable.

Preferably, the first side of the lever having the weight has a head with a portion intended to hit the external surface of the bag in operation.

Preferably, the portion intended to hit the external surface of the bag is formed to avoid damage to the bag, preferably is rounded and/or coated. Preferably, the weight has a mass of at least 0.5 kg, preferably of at least 1 kg.

Preferably, the motor is an electric or pneumatic motor and wherein the mixing device comprises a controller for operating the motor, the controller allowing setting of the timing of operation, preferably of a cycle frequency and/or a cycle pattern and/or a duration of operation.

Preferably, the mixing device comprises a sensor arrangement for detecting a mixing state of the content of the bag, the sensor arrangement arranged to cooperate with the controller to control operation of the motor in accordance with the detection result and/or issue a signal indicative of the detecting result.

Preferably, the motor is a clockwork motor which can be manually activated so that the device can work without electrical power supply.

BRIEF DESCRIPTION OF THE FIGURES

The description will be described in connection with specific embodiments by reference to the attached drawing, in which.

Figure 1:
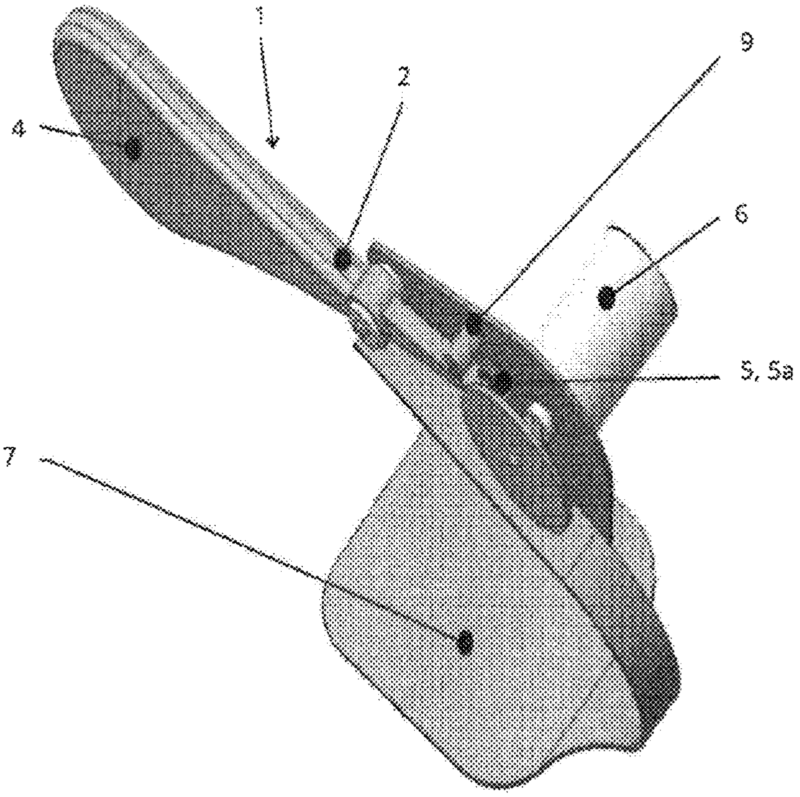
FIG. 1 is a perspective top view of a mixing device according to a preferred embodiment.

The mixing device 1 according to the invention as shown in FIG. 1 and FIGS. 2A to C for cyclically imparting a force on an external surface A of a layer of a bag B for agitating a content C of the bag comprises generally a lever 2. The lever 2 is supported on the device 1 so as to be able to rotate about a pivot 3. A weight or mass 4 is provided on a first side of the lever 2. A driver 5 is arranged to cooperate with the lever 2, and a motor 6 is provided for moving the driver 5 to lift the first side of the lever 2 with the weight 4 against gravity and to release or drop the first side, due to gravity of the weight 4, against the external surface A of the bag B.

The mixing device 1 further comprises a holder 7 for supporting the mixing device 1 such that the first side of the lever 2 can contact the external surface A of the bag B in the drop motion. The holder 7 also serves to fix the mixing device to the bag as described below.

The weight 4 can be placed on the first side of the lever 2 at its substantial extremity. It may be fixed or may be movable to change the position along the lever towards and away from the pivot 3 to change the momentum created by the weight about the pivot 3.

Figure 2A:
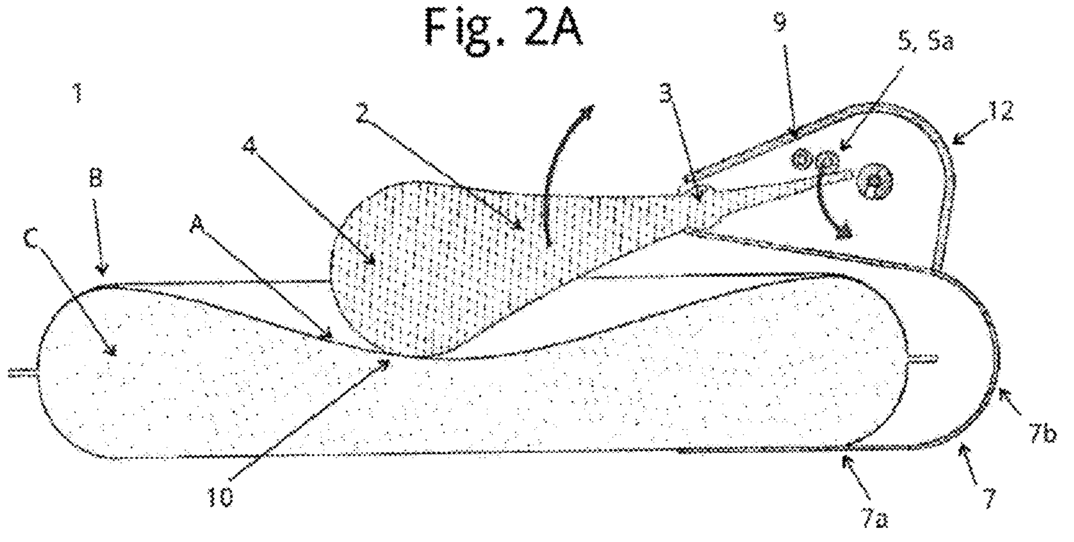
FIG. 2A to C are schematic representations of a mixing device similar to the first embodiment to explain the typical phases of operation.
Figure 2B:
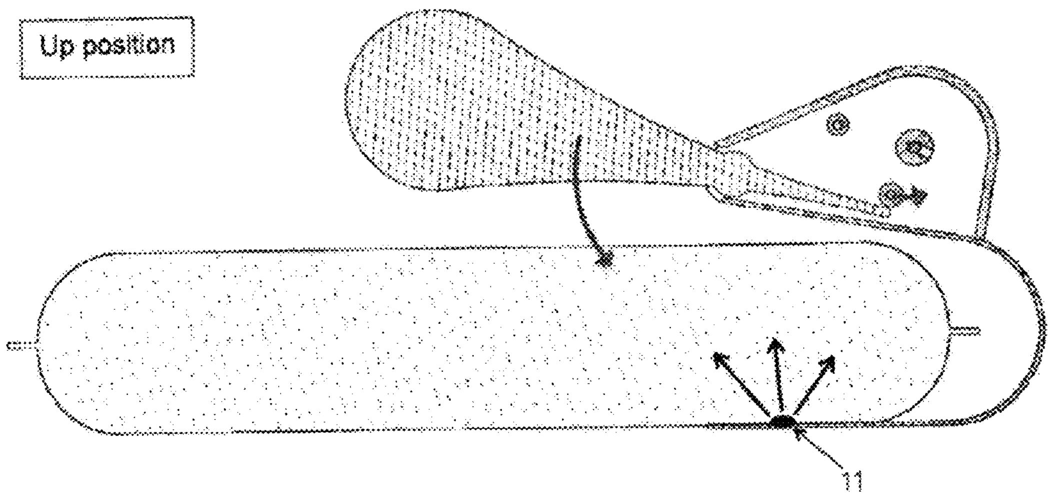
Figure 2C:
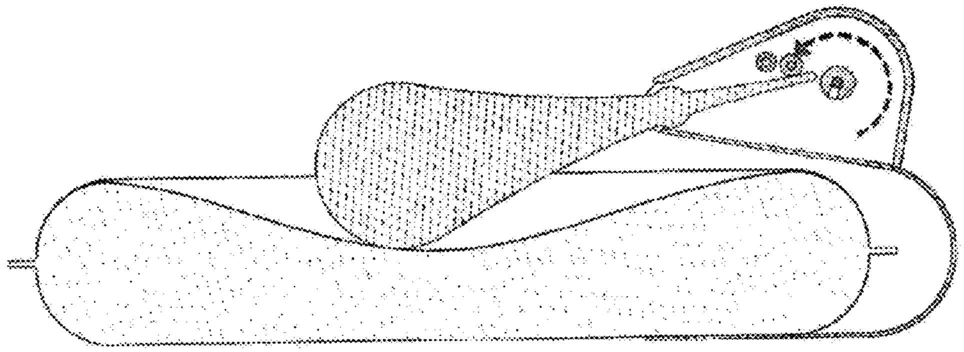

The driver 5 is in this case in the form of a pin 5*a* that is arranged eccentrically from an axis 8 of the motor 6 and is connected with the axis 8 of the motor 6 so as to be able to perform an orbiting movement when the motor 6 operates. The driver 5 or in this example the pin 5*a* is arranged to be cyclically engaged/disengaged with/from a second side of the lever 2 opposite to the pivot 3 from the first side. The motor 6 upon rotation moves the driver 5 (pin 5*a*) cyclically into and out of engagement with the second side of the lever 2 to lift the first side with the weight 4 against the gravity and to abruptly drop the first side due to gravity acting on the weight so that it hits the external surface A of the bag B. This sequence is shown in FIGS. 2A to C. The point of the lever (2) where the lifting force is introduced through the driver ca be located at any point that is preferably spaced from the pivot (3) in order to utilize the leverage effect. The force may be introduced, as shown in the embodiment, on the second side but may also be introduced on the same side as the weight is placed (i.e. the first side). It may be even introduced as a momentum into a pivot axis with no or no substantial distance from the pivot. The lever may be formed more or less symmetrical about a longitudinal axis of symmetry through the pivot as shown or may be formed unsymmetrical to arrange the point of introduction of the lifting force at an arm section that is displaced from the line of symmetry.

Figure 4:
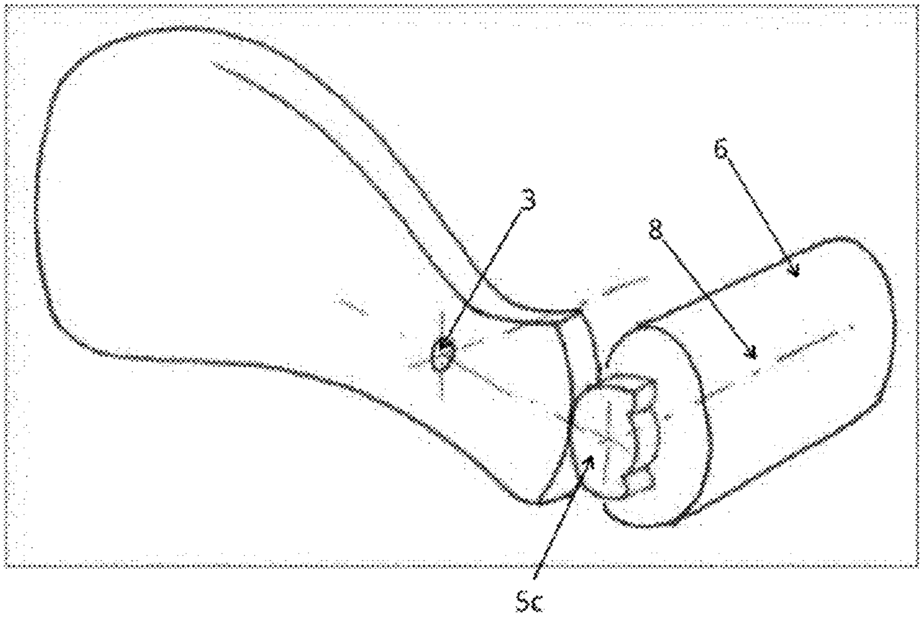
FIG. 4 is a variation of the drive mechanism of the mixing device according to a still further embodiment.

In an alternative arrangement to the eccentric pin 5*a* the driver 5 may comprise a cam 5*c* as shown in FIG. 4 arranged to cyclically engage with the second side of the lever 2 to lift the first side of the lever 2 with the weight 4 and to abruptly drop the first side when the section of the cam 5*c* with a recess is turned into a position where it disengages from the second end of the lever 2.

Figure 3:
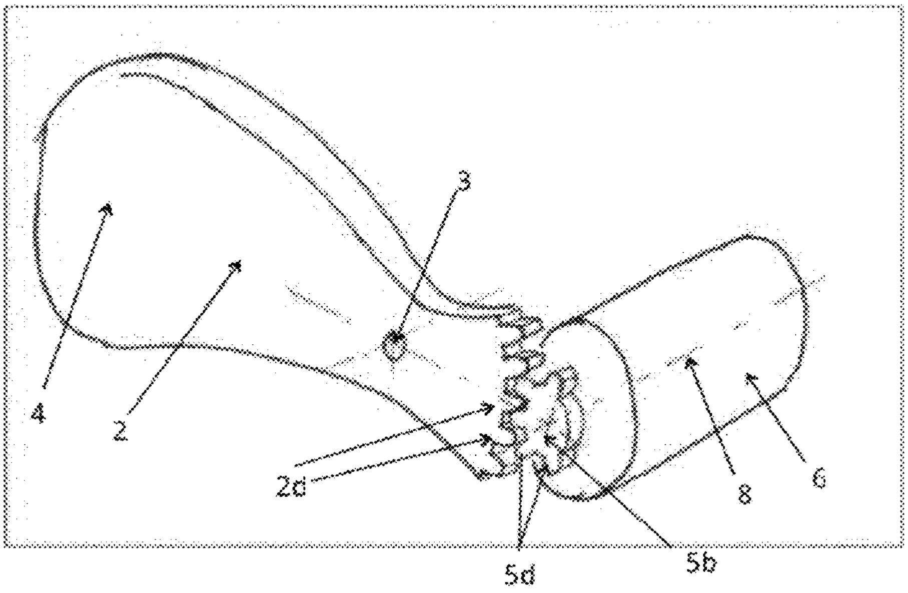
FIG. 3 is a variation of the drive mechanism of the mixing device according to another embodiment.

A still further alternative of the driver 5 similar to the cam 5*c* is a driver in the form of a sprocket 5*b* with one or more teeth 5*d* engaging with mating teeth 2*d* on the second side of the lever 2 as shown in FIG. 3. The rotation of the sprocket 5*b* engaging with the corresponding recesses between teeth 2*d* on the second side of the lever 2 rotates the lever 2 so that the first side thereof with the weight 4 is lifted. The sprocket 5*b* has no teeth on a certain section of its periphery arranged such that the disengagement of the teeth of the sprocket from those of the lever takes place shortly after the first side of the lever is at the top lift position, thereby letting the first side abruptly drop down against the surface of the bag.

Accordingly, the interaction between the driver 5 and the lever 2 is generally a cyclical form— and/or friction-locking engagement as long as the lever is pivoted to the top lift position and a disengagement when the first side of the lever is at the top lift position to release the engagement to let the lever drop down.

The driver may comprise one or several pins or teeth arranged to pivot the lever as described upon rotation of the driver by the motor.

The mixing device preferably comprises an abutment 9 to limit the drop motion of the first side of the lever 2. The abutment 9 may be in a fixed position or may be arranged to be movable between different positions to be able to adjust the drop height of the lever and the bottom drop position of the first end thereof.

The motor with the driver may be arranged in a casing that is schematically shown in the cross section of FIGS. 2A to C.

In the embodiment of FIG. 1 and FIGS. 2A to C the lever 2 is released when the pin 5*a* escapes and disengages from the second side of the lever at the position shown in FIG. 2B.

The holder 7 comprises a stand 7*a* arranged to be placed below the bag B and a bracket 7*b* connected to the stand 7*a* and supporting the mixing device, in particular the lever 2 and preferably the motor 6 and driver 5 (driving mechanism) above the bag with the bag placed therebetween (see FIG. 2A). The horizontal extension of the bracket 7*b* and/or of the stand 7*a* can be adjustable in order to be able to place the mixing device to the bag so that the first side of the lever, in particular the falling weight, can reach different areas on the surface of the bag. Likewise, the vertical spacing of the weight 4 in its bottom drop position above the stand 7*a* of the holder 7 can be adjustable in order to accommodate different sizes or thicknesses and filling degrees of bags and to ascertain that the weight hits and deforms the shape of the bag in the necessary amount. It can be, for example, realized by making the bracket 7*b* adjustable in its vertical extension or by providing brackets of different size to be exchangeably mountable to the mixing device. The holder 7 allows the mixing device to be arranged and immobilized on any position of the bag, i.e. at the centre, at the sides or the corners.

The first side of the lever 2 having the weight 4 has a head with a portion 10 that is intended to hit the external surface A of the bag B in operation. The portion 10 intended to hit the external surface A is formed to avoid damage (rupture) to/of the bag layer and it is preferably rounded to have a smooth surface. It can be alternatively or in addition coated with a soft and elastic material protecting the surface of the bag.

The holder can be alternatively embodied in the form of a belt or band that can be trained around the bag in order to fix the mixing device in its position above the surface intended to be hit by the falling lever. Further alternatively the holder may be in the form of a clipping system and may be even a fixing device arranged such that it is not necessarily suitable to attach the mixing device to the bag as such (as shown in the embodiments) but to any other suitable fixed surface, for example a plate upon which the bag is arranged. Thus, the holder may be designed to fix the mixing device relative to the bag.

In one embodiment the corners of the bag are fixed using magnets blocking the welded edge of the bag.

The bag used in conjunction with the mixing device should ideally contain no air or only a minimal volume of air or should be underfilled to minimize the strength required to deform the bag by means of the falling lever/weight and to move the liquid (content) in the bag. The height of the filled bag must be significantly lower than the planar dimensions of the bag and should be ideally close to the vertical displacement of the weight between the top lift position and the bottom drop position.

Examples of substances agitated in the bag by means of the mixing device of the invention comprise culture media in powder form which do not dissolve by itself unless agitated in a solvent. Other useful fields of application can be sterile baby food preparation from dry powder, e.g. dehydrated milk or milk substitutes. After addition of water to the dry powder the mixing device of the invention can be used for automated bag mixing and to accelerate the powder dissolution. Other fields of application are culture media preparation to feed bioreactors, for example cell culture media, culture media preparation for pharma sterility testing or for pathogen or total viable organism testing in food products or mixing of culture bags containing cells, e.g. eukaryotic or prokaryotic cells, to keep cells in suspension to improve growth/production of biomolecules, or chemical solution preparation, wherein the chemical solution can be a wash buffer, an elution buffer, a storage buffer for chromatography purification application for the purification of antibodies.

The suitable weight on the lever depends from the size of the mixing device and the thickness/volume of the bags with which it is to operate. A typical weight can have a mass of 0.5 kg or more or preferably 1 kg or more for a bag with a fill capacity of 201.

The motor of the drive mechanism can be an electric motor or a pneumatic motor. The mixing device may comprise a controller for operating such a motor, wherein the controller can be configured to allow setting of the timing of operation, preferably of a cycle frequency and/or a cycle pattern and/or a duration of operation. The setting may be in the form of predefined programs or programming functions for the respective parameters in order to adapt the cycle of hitting the weight against the surface of the bag to the desired application/substance in the bag.

The mixing device may comprise a sensor arrangement 11 (schematically shown in FIG. 2B) which can be a light or ultrasonic emitter and receiver, for example, for detecting the content of solid particles in a liquid based on the translucency and/or reflectivity of the content of the bag with respect to the emitted and reflected light or ultrasonic changes depending on the dissolution state. The sensor arrangement 11 may be arranged to cooperate with the controller to automatically control operation of the motor in accordance with the detection result and/or to issue a signal indicative of the detecting result to alert users that the content is at a desired solution state or not.

In a very simple embodiment the motor may be a purely mechanical clock-work motor that can be driven by a coil spring that is manually loaded or activated and can perform the rotation of the driver for a certain period of time. Such an embodiment is independent from any electrical supply and can be beneficial where the mixing device is to be used in a closed environment where no electricity is available, i.e. in a heating chamber or incubator, or at sites where no electricity is available.

The use of the sensor arrangement and its cooperation with the motor allows, for example, automatic stopping of the mixing device when the content of the bag is fully dissolved.

The invention claimed is:

1. A mixing device (1) for cyclically imparting a force on an external surface (A) of a bag (B) for agitating a content (C) of the bag (B), the mixing device (1) comprising:

a lever (2) supported so as to be able to pivot about a pivot (3);

a weight (4) provided on a first side of the lever (2);

a driver (5) arranged to cooperate with the lever (2);

a motor (6) for moving the driver (5) to lift the first side of the lever (2) with the weight (4) against gravity and to drop the first side against the external surface (A) of the bag (B); and a holder (7) for supporting the mixing device (1) such that the first side of the lever (2) can contact the external surface (A) of the bag (B) in a drop motion, the holder (7) comprising a stand (7*a*) arranged to be placed below the bag (B) and a bracket (7*b*) connected to the stand (7*a*) and supporting the lever (2) above the bag (B) with the bag (B) placed therebetween, wherein the weight (4) and the lever (2) are configured so that the weight (4) contacts the external surface (A) of the bag (B) in the drop motion, and wherein the stand (7*a*) and at least a portion of the bracket (7*b*) are arranged such that the bag slides in between or is sandwiched by the stand (7*a*) and the bracket (7*b*) of the holder (7); and wherein the lever (2), the driver (5), and the motor (6) are directly coupled to the bracket (7*b*) of the holder (7).

2. The mixing device (1) according to claim 1, wherein the driver (5) is engaged with or is arranged to be engaged with and disengaged from the lever (2) at a position spaced from the pivot (3) or a pivot axis, and the motor (6) is arranged to move the driver (5) in engagement with or to cyclically move the driver (5) into and out of engagement with the lever (2), or the pivot axis of the lever (2) to lift the first side with the weight (4) against gravity and to drop the first side due to gravity of the weight (4) against the external surface (A) of the bag (B).

3. The mixing device (1) according to claim 2, wherein the driver (5) is arranged such that the disengagement of the driver (5) from the lever (2), or the pivot axis of the lever (2) is made abrupt when the weight (4) at the first side of the lever (2) is at a top lift position.

4. The mixing device (1) according to claim 1, wherein the driver (5) comprises a cam (5*c*) arranged to be rotated by the motor (6).

5. The mixing device (1) according to claim 1, wherein the driver (5) comprises one or more pin(s) (5*a*) or tooth/teeth (5*b*) arranged eccentrically from an axis (8) of the motor (6) and connected with the axis (8) of the motor (6) so as to be able to perform an orbiting movement.

6. The mixing device (1) according to claim 1, further comprising an abutment (9) for limiting the drop motion of the lever (2) at a bottom drop position.

7. The mixing device (1) according to claim 1, wherein a horizontal extension of the stand (7*a*) and/or the bracket (7*b*) is adjustable.

8. The mixing device (1) according to claim 1, wherein a vertical spacing of the weight (4) in a bottom drop position of the lever (2) above the stand (7*a*) of the holder (7) is adjustable.

9. The mixing device (1) according to claim 1, wherein the first side of the lever (2) having the weight (4) has a head with a portion (10) intended to hit the external surface (A) of the bag (B) in operation.

10. The mixing device (1) according to claim 9, wherein the portion (10) intended to hit the external surface (A) of the bag (B) is formed to avoid damage to the bag (B).

11. The mixing device (1) according to claim 1, wherein the weight (4) has a mass of at least 0.5 kg.

12. The mixing device (1) according to claim 1, wherein the motor (6) is an electric or pneumatic motor and wherein the mixing device (1) comprises a controller for operating the motor (6), the controller allowing setting of a timing of operation.

13. A mixing device (1) for cyclically imparting a force on an external surface (A) of a bag (B) for agitating a content (C) of the bag (B), the mixing device (1) comprising:

a lever (2) supported so as to be able to pivot about a pivot (3);

a weight (4) provided on a first side of the lever (2);

a driver (5) arranged to cooperate with the lever (2);

a motor (6) for moving the driver (5) to lift the first side of the lever (2) with the weight (4) against gravity and to drop the first side against the external surface (A) of the bag (B); and a holder (7) for supporting the mixing device (1) such that the first side of the lever (2) can contact the external surface (A) of the bag (B) in a drop motion, wherein the motor (6) is an electric or pneumatic motor and wherein the mixing device (1) comprises a controller for operating the motor (6), the controller allowing setting of a timing of operation, wherein the mixing device (1) comprises a sensor arrangement (11) for detecting a mixing state of the content (C) of the bag (B), the sensor arrangement (11) arranged to cooperate with the controller to control operation of the motor (6) in accordance with a detection result and/or issue a signal indicative of the detection result.

14. The mixing device (1) according to claim 1, wherein the motor (6) is a clockwork motor.

15. The mixing device (1) according to claim 9, wherein the portion (10) intended to hit the external surface (A) of the bag (B) is rounded and/or coated.

16. The mixing device (1) according to claim 1, wherein the weight (4) has a mass of at least 1 kg.

17. The mixing device (1) according to claim 12, wherein the controller allows setting of the timing of operation based on a cycle frequency and/or a cycle pattern and/or a duration of operation.

18. The mixing device (1) according to claim 2, wherein the driver (5) is engaged with or is arranged to be engaged with and disengaged from the lever (2) at a position spaced from the pivot (3) at a second side of the lever (2) opposite to the pivot (3) from the first side, or a pivot axis.

19. The mixing device (1) according to claim 1, wherein the mixing device (1) cyclically imparts a force on an external surface (A) of a bag (B) and agitates a content (C) of the bag (B).

* * * * *